US012165525B2

(12) United States Patent
Samuthirapandian et al.

(10) Patent No.: US 12,165,525 B2
(45) Date of Patent: Dec. 10, 2024

(54) COMPARATIVE VERTICAL PROFILE DISPLAYS

(71) Applicant: HONEYWELL INTERNATIONAL INC., Charlotte, NC (US)

(72) Inventors: Subash Samuthirapandian, Bangalore (IN); Christopher Heine, Phoenix, AZ (US); Ivan Sandy Wyatt, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 114 days.

(21) Appl. No.: 17/655,050

(22) Filed: Mar. 16, 2022

(65) Prior Publication Data

US 2023/0215280 A1 Jul. 6, 2023

(30) Foreign Application Priority Data

Jan. 5, 2022 (IN) .............................. 202211000591

(51) Int. Cl.
*G08G 5/00* (2006.01)
*B64D 43/00* (2006.01)
*G01C 23/00* (2006.01)
*G05D 1/00* (2024.01)

(52) U.S. Cl.
CPC ........... *G08G 5/0021* (2013.01); *B64D 43/00* (2013.01); *G01C 23/005* (2013.01); *G08G 5/003* (2013.01); *G08G 5/0086* (2013.01)

(58) Field of Classification Search
None
See application file for complete search history.

(56) References Cited

U.S. PATENT DOCUMENTS

| | | | |
|---|---|---|---|
| 7,089,091 B2 * | 8/2006 | Artini | G05D 1/0646 701/16 |
| 8,660,716 B1 * | 2/2014 | Rahmes | G01C 23/00 701/4 |
| 9,940,085 B2 | 4/2018 | Albert et al. | |
| 11,030,907 B1 * | 6/2021 | S | G08G 5/0021 |
| 11,056,011 B2 | 7/2021 | Cazaux et al. | |
| 2008/0208400 A1 | 8/2008 | Bouchet et al. | |
| 2010/0250032 A1 * | 9/2010 | Gremmert | G05D 1/101 701/9 |

(Continued)

FOREIGN PATENT DOCUMENTS

EP 3101642 A1 * 12/2016

*Primary Examiner* — Adam D Tissot
*Assistant Examiner* — Michael T Silva
(74) *Attorney, Agent, or Firm* — Lorenz & Kopf LLP

(57) ABSTRACT

Methods and systems are provided for assisting operation of an aircraft when diverting from a flight plan using a comparative vertical profile display. A vertical profile display includes a first graphical representation of a first vertical profile corresponding to a first lateral route defined by a flight plan for the aircraft and a second graphical representation of a second vertical profile corresponding to a modified lateral route different from the first lateral route displayed concurrently on the vertical profile display. The first vertical profile corresponding to the first lateral route is depicted on the vertical profile display in a first plane and the second vertical profile corresponding to the modified lateral route is depicted on the vertical profile display in a second plane different from the first plane.

17 Claims, 3 Drawing Sheets

(56) References Cited

U.S. PATENT DOCUMENTS

| | | | |
|---|---|---|---|
| 2016/0011741 A1 | 1/2016 | Khatwa et al. | |
| 2020/0168104 A1* | 5/2020 | Holder | G08G 5/0039 |
| 2020/0273349 A1* | 8/2020 | De Villele | B64D 45/00 |

* cited by examiner

COMPARATIVE VERTICAL PROFILE DISPLAYS

CROSS REFERENCE TO RELATED APPLICATION

This application claims priority to Indian Provisional Patent Application No. 202211000591, filed Jan. 5, 2022, the entire content of which is incorporated by reference herein.

TECHNICAL FIELD

The subject matter described herein relates generally to vehicle systems, and more particularly, embodiments of the subject matter relate to aircraft systems capable of presenting multiple potential routes on a vertical profile display.

BACKGROUND

Pilots, air traffic controllers, airline personnel and the like routinely monitor meteorological data, reports, and forecasts to assess any potential impacts on the current or anticipated flight plan and the intended destination. However, in situations where the aircraft needs to deviate from the original plan, the information needs to be reanalyzed with respect to the deviation to facilitate continued safe operation. This requires consideration of numerous pieces of information (e.g., fuel remaining and distance to be traveled, weather radar and/or forecast information, terrain, obstacles, NOTAMs, SIGMETs, PIREPs, and the like), which often is distributed across different displays or instruments, requiring the pilot to mentally piece together all the different information from the different sources, while in some instances, also manually flying the aircraft concurrently. Additionally, the time-sensitive nature of aircraft operation can increase the stress on the pilot, which, in turn, increases the likelihood of pilot error.

For example, there are many variables to consider when deviating from a flight plan or otherwise diverting from an originally-planned route of travel, such as, for example, the estimated travel time, distance and/or fuel burn, as well as the meteorological conditions, the topography and/or altitude margin while en route. Often, a pilot must integrate and form a decision based upon multiple different displays. Accordingly, it is desirable to reduce the mental workload of the pilot or other aircraft operator and reduce the time required to analyze the operational significance of a potential diversion while providing improved situational awareness in a complex situation.

BRIEF SUMMARY

Methods and systems are provided for assisting operation of an aircraft diverting from a flight plan using a comparative vertical profile graphical user interface (GUI) display. The comparative vertical profile display concurrently depicts a first graphical representation of a first vertical profile corresponding to a first lateral route defined by a flight plan for the aircraft and a second graphical representation of a second vertical profile corresponding to a modified lateral route different from the first lateral route. The graphical representations of the different vertical profiles corresponding to the different lateral routes are depicted on the vertical profile display in different planes.

In one embodiment, a method of generating a comparative vertical profile GUI display for assisting operation of an aircraft on a display device associated with the aircraft involves obtaining indicia of a modified lateral route different from a flight plan route for the aircraft, determining an anticipated vertical trajectory for the aircraft along the modified lateral route based at least in part on a current altitude of the aircraft, and providing a graphical representation of the anticipated vertical trajectory for the aircraft on the comparative vertical profile GUI display within a first plane associated with the modified lateral route concurrently to providing a graphical representation of a second vertical trajectory associated with the flight plan route within a second plane different from the first plane.

In another embodiment, an apparatus is provided for a non-transitory computer-readable medium having computer-executable instructions stored thereon. The computer-executable instructions, when executed by a processing system, cause the processing system to obtain information pertaining to a modified lateral route different from a flight plan route, determine an anticipated vertical trajectory along the modified lateral route, and provide, on a display device, a graphical representation of the anticipated vertical trajectory on a comparative vertical profile GUI display within a first plane associated with the modified lateral route, wherein the comparative vertical profile GUI display comprises a graphical representation of a second vertical trajectory associated with the flight plan route within a second plane different from the first plane.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
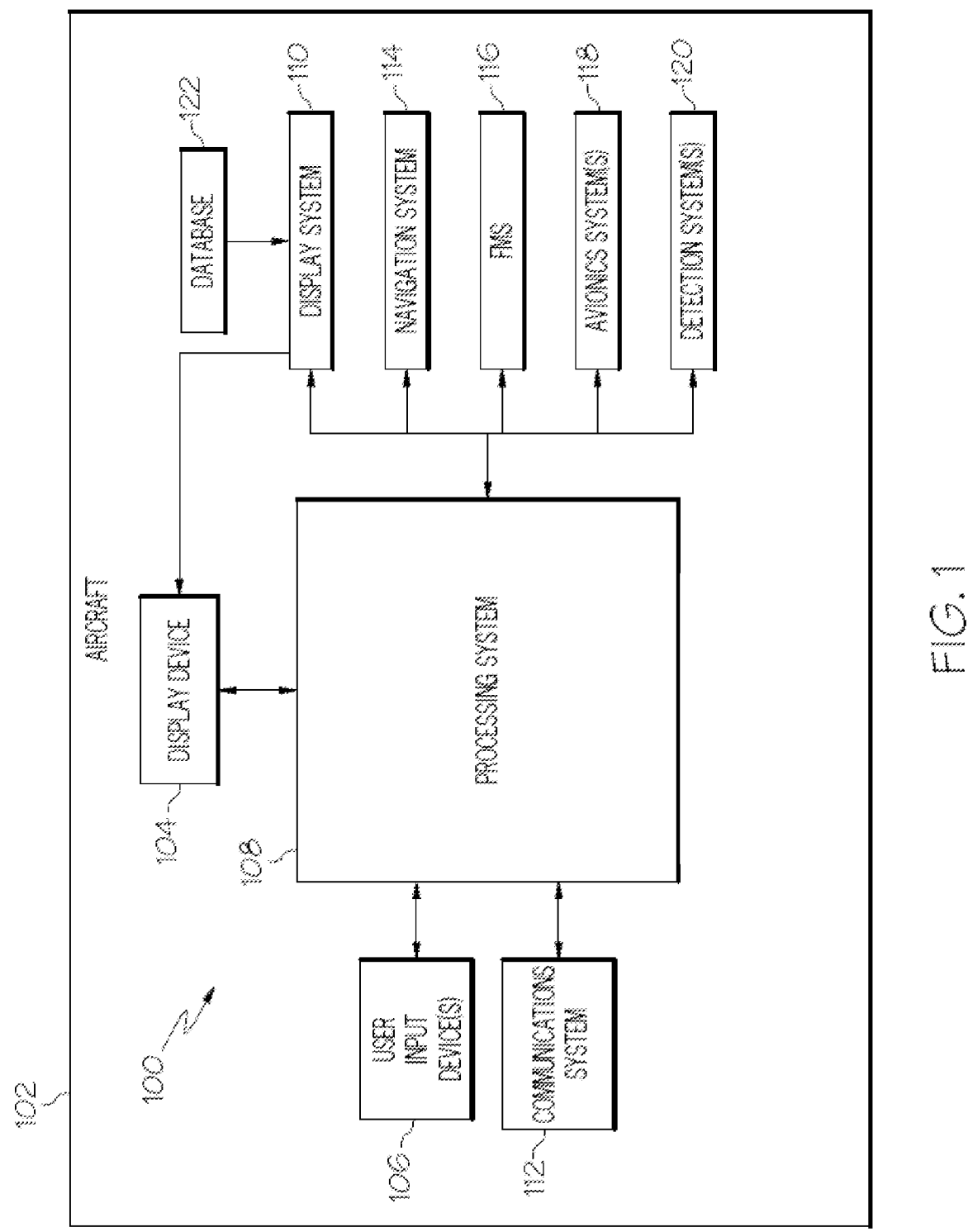
FIG. 1 is a block diagram of a system for an aircraft in an exemplary embodiment.

Embodiments of the subject matter described herein generally relate to systems and methods for assisting operation of a vehicle en route to a destination along a planned route of travel. While the subject matter described herein could be utilized in various applications or in the context of various different types of vehicles, both manned and unmanned, exemplary embodiments are described herein in the context of an aircraft. In particular, the subject matter may be described primarily in the context of a potential deviation from a route defined by a flight plan.

As described in greater detail below in the context of FIG. 2-3, when a pilot, co-pilot or other user (e.g., an air traffic controller or the like) attempts to modify the proposed route of travel in a lateral (or horizontal) dimension, for example, by defining one or more alternative waypoints for a potential route that laterally deviates from the originally-planned route of travel according to the flight plan, a comparative vertical profile display is provided that concurrently depicts a graphical representation of a vertical profile corresponding to the initially-planned lateral route defined by the flight plan along with a graphical representation of a vertical profile corresponding to the potential modified lateral route that traverses the alternative waypoints. The different vertical profiles are depicted in different planes that are parallel to one another and separated by an offset along an axis of translation (alternatively referred to herein as the projection axis) that is orthogonal to both the horizontal axis corresponding to the lateral (or horizontal) distance and the vertical axis corresponding to the altitude (or above ground level). In this regard, the current aircraft position and other positions that are common to both routes are effectively translated and coaxially-aligned along the orthogonal projection axis to effectively provide an oblique projection between the different vertical profile planes.

In one or more exemplary embodiments, the vertical profile plane associated with the modified route overlies or is otherwise depicted in front of the vertical profile plane associated with the initial flight plan route, and the positions of the modified route that deviate from or otherwise differ from the initial flight plan route are rendered within the modified route vertical profile plane using a visually distinguishable graphical characteristic (e.g., a cyan color) that is different from the graphical characteristic (e.g., a magenta color) used to render positions of the initial flight plan route within the flight plan route vertical profile plane. In this regard, in exemplary embodiments, the current aircraft position, common waypoints, or other positions that are common to both routes are rendered using a common graphical characteristic (e.g., a gray color) that allows a pilot or other user to quickly differentiate common portions of the two different routes from the other portions of the depicted routes that are the subject of modification. Within each respective vertical profile plane, a graphical representation or depiction of the terrain underlying the respective route is rendered or otherwise provided at the corresponding horizontal locations along the horizontal axis of the respective vertical profile plane with corresponding altitudes along the vertical axis of the respective vertical profile plane. Similarly, graphical representations or depictions of the meteorological conditions, air traffic, airspace restrictions, or other conditions along the respective route are rendered or otherwise provided at the corresponding horizontal locations along the horizontal axis of the respective vertical profile plane with corresponding altitudes along the vertical axis of the respective vertical profile plane. In exemplary embodiments, the depictions of the terrain, meteorological conditions, airspace restrictions and the like are rendered using different visually distinguishable characteristics depending on the respective vertical profile plane. For example, the depictions of the terrain, meteorological conditions, airspace restrictions and the like that are rendered within the overlying modified route vertical profile plane may be rendered using different levels of transparency, translucency, tinting, shading, saturation, fading and/or the like to facilitate differentiation from the depictions of the terrain, meteorological conditions, airspace restrictions and the like that are rendered within the underlying initial flight plan route vertical profile plane. Thus, the pilot or other user may quickly discern which route is potentially impacted by which depicted conditions.

By virtue of concurrently depicting the vertical situation for both the currently active flight plan route as well as the potential modified route, a pilot, co-pilot, ATC or other user can quickly and visually understand where and how the potential route deviates from the flight plan route and what the nature or impact of the deviation is by also depicting the terrain, meteorological conditions and the like with respect to both routes, thereby improving both the tactical and strategic vertical situation awareness with respect to the potential modifications. For example, when a pilot interacts with a lateral map or other navigational map display, a waypoint list window, or another onboard display to modify one or more waypoints that define the lateral route of the original flight plan to create a potential modified flight plan (or pending flight plan), the comparative vertical profile graphical user interface (GUI) display is generated to concurrently depict the vertical profiles for both the flight plan route and the pending flight plan route to allow the pilot to simultaneously view the respective vertical situations with respect to the terrain, weather and/or other conditions of interest relevant to the respective routes on the same display. The different vertical profiles for the different routes are depicted in separate, independent vertical profile planes that run parallel to one another but are obliquely offset along an orthogonal projection axis that permits unobstructed concurrent viewing of the vertical profiles, where each respective vertical profile plane includes only the terrain, weather and/or other conditions of interest underlying, traversed by, or otherwise relevant to its respective route, with the terrain, weather and/or other conditions of interest being rendered in a manner that allows the pilot to visually associate the depicted conditions with their appropriate route and visually differentiate depicted conditions associated with one route from those associated with the other route.

FIG. 1 depicts an exemplary embodiment of a system 100 which may be located onboard a vehicle, such as an aircraft 102. The system 100 includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a terrain database 122 that includes positional (e.g., latitude and longitude), altitudinal, and other attribute information (e.g., terrain type information, such as water, land area, or the like) for the terrain, obstacles, and other features to support rendering depictions of the terrain, as described in greater detail below.

Still referring to FIG. 1, in one or more exemplary embodiments, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in one or more exemplary embodiments, the navigation system 114 includes inertial reference sensors capable of obtaining or otherwise determining the attitude or orientation (e.g., the pitch, roll, and yaw, heading) of the aircraft 102 relative to earth.

In one or more exemplary embodiments, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historical meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 122 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
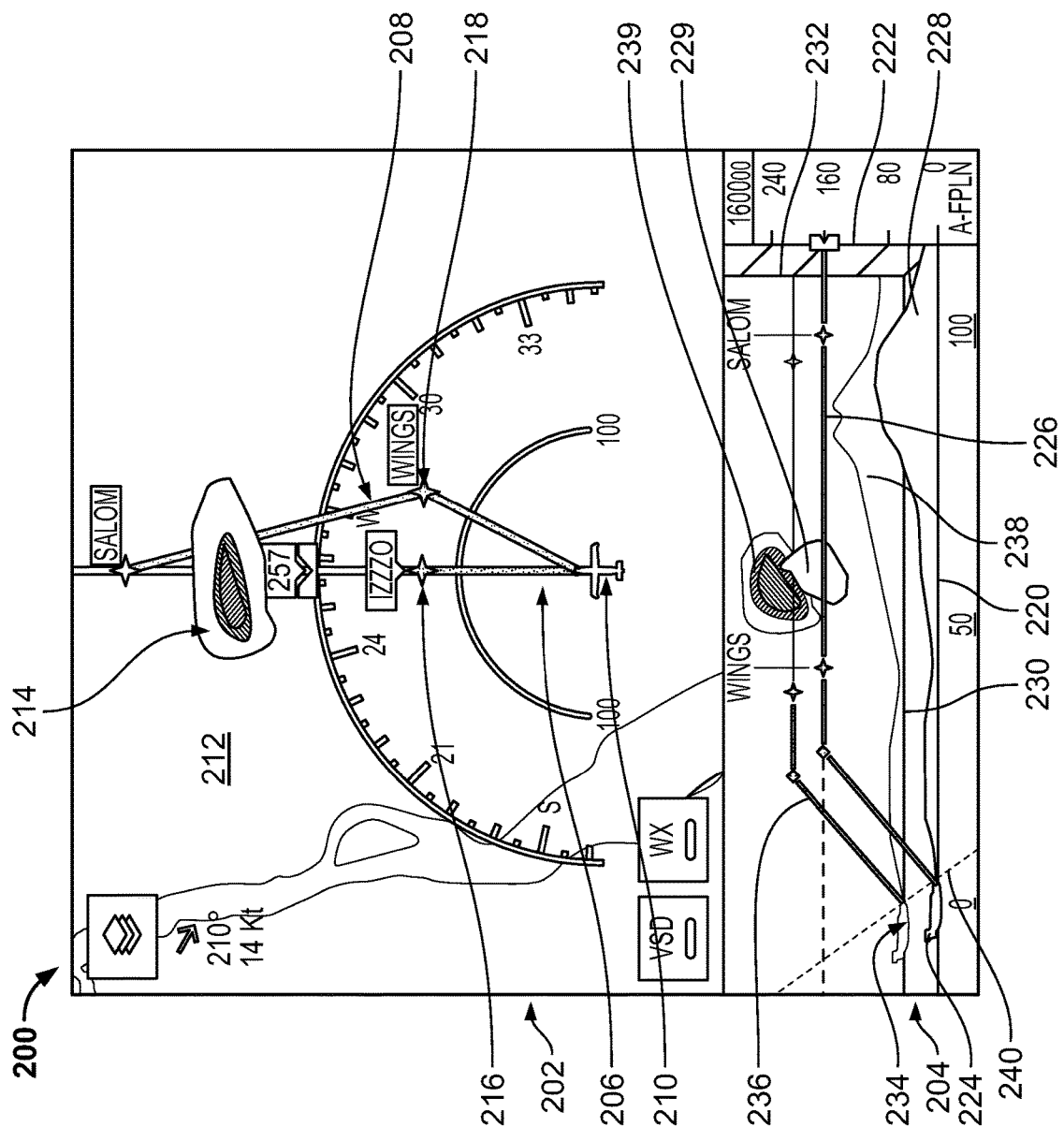
FIG. 2 depicts an exemplary graphical user interface (GUI) display that includes a comparative vertical profile GUI display suitable for presentation on a display device onboard the aircraft in the system of FIG. 1 in accordance with one or more embodiments.

FIG. 2 depicts an exemplary graphical user interface (GUI) display 200 that may be displayed, rendered, or otherwise presented by the processing system 108 and/or display system 110 as a flight deck display on a display device 104 onboard an aircraft 102 when a pilot, co-pilot or other user attempts to modify a proposed route of travel depicted on a navigational map display 202 in a lateral (or horizontal) dimension. The GUI display 200 includes a comparative vertical profile display 204 adjacent to the navigational map display 202 that concurrently depicts vertical profiles corresponding to the initially-planned lateral route 206 defined by the flight plan and the potential modified lateral route 208 depicted on the navigational map display 202. In this regard, FIG. 2 depicts a state of the GUI display 200 on the display device 104 after one or more waypoints for a modified route 208 have been defined to provide an alternative lateral route of travel that deviates from the initial flight plan route 206 to avoid or otherwise mitigate the impact of upcoming meteorological conditions depicted on the map 202 (e.g., region 214), for example, by traveling from the current location of the aircraft to an alternative waypoint 218 ("WINGS") while en route to a common waypoint ("SALOM") instead of the next planned waypoint 216 ("IZZZO") according to the flight plan route 206. In this regard, prior to the potential flight plan modification, the navigational map 202 may include a graphical representation of a portion of the route 206 defined by a flight plan while the vertical profile display includes a graphical representation of the vertical profile of the portion of the flight plan route 206 depicted on the navigational map 202 that is ahead of the aircraft or is otherwise yet to be flown by the aircraft.

In one or more embodiments, the navigational map 202 includes a graphical representation 210 of the aircraft 102 overlaid or rendered on top of a background 212, which is generally realized as a graphical representation of the terrain, topology, navigational reference points, airspace designations and/or restrictions, or other suitable items or points of interest corresponding to the currently displayed area of the navigational map 202, which may be maintained in a terrain database, a navigational database, a geopolitical database, or another suitable database. For example, the display system 110 may render a graphical representation of navigational aids (e.g., VORs, VORTACs, DMEs, and the like) and airports within the currently displayed geographic area of the navigational map 202 overlying the background 212. Some embodiments of navigational map 202 may also include graphical representations of airspace designations and/or airspace restrictions, cities, towns, roads, railroads, and other geo-political information. Additionally, in exemplary embodiments, graphical representations of meteorological regions (e.g., region 214), such as convection, turbulence or other meteorological conditions identified by an onboard detection system 120 or another monitoring system, are rendered or otherwise displayed on the navigational map 202 overlying the background 212. It should be noted that although FIG. 2 depicts a top view (e.g., from above the aircraft 210) of the navigational map 202 (alternatively referred to as a lateral map or lateral view), in practice, alternative embodiments may utilize various perspective views, such as side views, three-dimensional views (e.g., a three-dimensional synthetic vision display), angular or skewed views, and the like.

In one or more exemplary embodiments, the navigational map 202 is associated with the movement of the aircraft 102, and the aircraft symbology 210 and/or background 212 refreshes or otherwise updates as the aircraft 102 travels, such that the graphical representation of the aircraft 210 is positioned over the terrain background 212 in a manner that accurately reflects the current (e.g., instantaneous or substantially real-time) real-world positioning of the aircraft 102 relative to the earth. In some embodiments, the aircraft symbology 210 is shown as traveling across the navigational map 202 (e.g., by updating the location of the aircraft symbology 210 with respect to the background 212), while in other embodiments, the aircraft symbology 210 may be located at a fixed position on the navigational map 202 (e.g., by updating the background 212 with respect to the aircraft symbology 210 such that the map 202 is maintained centered on and/or aligned with the aircraft symbology 210). Additionally, depending on the embodiment, the navigational map 202 may be oriented in a cardinal direction (e.g., oriented north-up so that moving upward on the map 202 corresponds to traveling northward), or alternatively, the orientation of the navigational map 202 may be track-up or heading-up (i.e., aligned such that the aircraft symbology 210 is always traveling in an upward direction and the background 212 adjusted accordingly).

Still referring to FIG. 2, in exemplary embodiments, in response to receiving indicia or information pertaining to a modified route, the vertical profile display 204 is automatically and dynamically updated to provide a comparative vertical profile display that concurrently depicts both a graphical representation of the vertical profile associated with the flight plan route 206 and a graphical representation of the vertical profile associated with the modified route 208 depicted on the navigational map 202. In the illustrated embodiment, the modified route vertical profile is rendered or otherwise displayed within a first plane defined by a horizontal (or lateral) axis 220 that corresponds to the horizontal geographic distance along the track defined by the modified route 208 and a vertical axis 222 that is perpendicular to the horizontal axis 220 and corresponds to the altitude or above ground level at points along the horizontal axis 220. The flight plan route vertical profile is rendered or otherwise displayed within a second plane defined by a second horizontal (or lateral) axis 230 that corresponds to the horizontal geographic distance along the track defined by the flight plan route 206 and a second vertical axis 232 that is perpendicular to the horizontal axis 230 and corresponds to the altitude or above ground level at points along the horizontal axis 230. The respective planes defined by modified route vertical profile axes 220, 222 and the flight plan route vertical profile axes 230, 232 are parallel and offset from one another by equal distances along a projection axis 240 that is orthogonal to the respective vertical profile planes. In this regard, the projection axis 240 is perpendicular to each of the modified route vertical profile axes 220, 222 and the flight plan route vertical profile axes 230, 232.

In exemplary embodiments, the projection axis 240 is tilted or otherwise angled to provide an isometric perspective view that effectuates an oblique projection between the different vertical profile planes that allows the vertical profile information depicted within each respective vertical profile plane to be viewed simultaneously on the comparative vertical profile display. The modified route vertical profile display includes a graphical representation 224 of the aircraft 102 that is positioned at a first coordinate location with respect to the horizontal axis 220 that corresponds to the current geographic location of the aircraft 102 along the track defined by the modified route 208 and a second coordinate location with respect to the vertical axis 222 that corresponds to the current altitude of the aircraft 102. The modified route vertical profile display also includes a graphical representation 226 of the planned or expected altitude of the aircraft 102 with respect to the vertical axis 222 when traveling along the modified route 208 at corresponding locations with respect to the horizontal axis 220. For example, in exemplary embodiments where the graphical representation 224 of the aircraft 102 is disposed at or near a left edge of the vertical profile display, the graphical representation 226 of the vertical profile of the modified route 208 extends from the aircraft symbology 224 towards the right of the vertical profile display to depict the planned altitudes for the aircraft 102 at future navigational reference points or geographic locations along the modified route 208 with respect to the current aircraft position. The modified route vertical profile display also includes a graphical representation 228 of the terrain underlying the upcoming portions of the modified route 208 at corresponding coordinate locations with respect to the horizontal and vertical axes 220, 222 that correspond to the real-world geographic locations with respect to the modified route 208 and corresponding altitudes for the respective terrain features. Additionally, the modified route vertical profile display includes a graphical representation 229 of the portion of the meteorological region 214 that is traversed by or otherwise collocated with the modified route 208 at corresponding coordinate locations with respect to the horizontal axis 220 corresponding to the real-world geographic locations of the portions of the meteorological region 214 with respect to the modified route 208 and at corresponding coordinate locations with respect to the vertical axis 222 corresponding to the real-world altitude of the portions of the meteorological region 214.

In a similar manner, the flight plan route vertical profile display includes a graphical representation 234 of the aircraft 102 that is positioned at a first coordinate location with respect to the horizontal axis 230 that corresponds to the current geographic location of the aircraft 102 along the track defined by the modified route 208 and a second coordinate location with respect to the vertical axis 232 that corresponds to the current altitude of the aircraft 102. In this regard, since the current location and altitude of the aircraft 102 is independent of the particular route 206, 208 currently being flown, the positions of the aircraft symbology 224, 234 depicted within the two different vertical profile reference planes are coaxially aligned with one another along the projection axis 240. The flight plan route vertical profile display also includes a graphical representation 236 of the planned or expected altitude of the aircraft 102 with respect to the vertical axis 238 when traveling along the flight plan route 206 at corresponding locations with respect to the horizontal axis 230. The flight plan route vertical profile display includes a graphical representation 238 of the terrain underlying the upcoming portions of the flight plan route 206 at corresponding altitudes with respect to the vertical axis 232 along with a graphical representation 239 of the portion of the meteorological region 214 that is traversed by or otherwise collocated with the flight plan route 206 at corresponding coordinate locations with respect to the horizontal axis 230 corresponding to the real-world geographic locations of the portions of the meteorological region 214 and at corresponding coordinate locations with respect to the vertical axis 232 corresponding to the real-world altitude of the portions of the meteorological region 214.

In exemplary embodiments, the graphical elements or features depicted or otherwise displayed within the flight plan vertical profile plane are rendered using one or more visually distinguishable graphical characteristics that are different from those utilized to render the graphical elements or features depicted within the modified route vertical profile plane to allow the pilot or other user to quickly visually differentiate and visually associate different graphical elements or features with their respective different route 206, 208. For example, the aircraft symbology 234, route symbology 236, terrain symbology 238 and meteorological region symbology 239 rendered within the flight plan vertical profile plane may be rendered with a higher transparency or a different fading, tinting, shading or saturation than is used to render the corresponding symbology 224, 226, 228, 229 rendered within the modified route vertical profile plane to deemphasize the graphical elements or features depicted within the within the flight plan vertical profile plane while the pilot or other user assesses the depictions within the within the modified route vertical profile plane to make a determination with respect to whether or how to proceed with the modified route 208, while still allowing the pilot to simultaneously assess the graphical elements or features depicted within the flight plan vertical profile plane as needed or desired.

Additionally, in exemplary embodiments, the portions of the route symbology 226 corresponding to the segments of the modified route 208 that deviate from the original flight plan route 206 are rendered or otherwise displayed using a different visually distinguishable characteristic than is used for segments of the route symbology 236 of the original flight plan route 206 to enable the pilot or other user to quickly visually differentiate and identify the differences between routes 206, 208. For example, the portions of the route symbology 226 corresponding to the segments of the modified route 208 from the current location of the aircraft 102, 210 to the modified WINGS waypoint 218 and from the modified WINGS waypoint 218 to the originally planned SALOM waypoint may be rendered using a cyan color, while the portions of the route symbology 236 corresponding to the segments of the flight plan route 206 from the current location of the aircraft 102, 210 to the original IZZZO waypoint 216 and from the original IZZZO waypoint 216 to the originally planned SALOM waypoint may be rendered using a magenta color, thereby allowing the pilot to quickly and easily visually differentiate and discern the differences between the depicted routes 206, 208. In exemplary embodiments, the SALOM waypoint that is common to both routes 206, 208 as well as the portions of the route symbology 226 corresponding to the segments of the modified route 208 that extend onward from the originally planned SALOM waypoint in common with the portions of the route symbology 236 corresponding to the segments of the original flight plan route 206 from the originally planned SALOM waypoint onward are rendered using the same color (e.g., gray) or other visually distinguishable characteristic that conveys to the pilot or other user that those portions of the modified route symbology 226 depicted in the comparative vertical profile display are the same as the corresponding portions of the original flight plan route 206. By deemphasizing the common portions of the different routes 206, 208 and enabling the pilot or other user to visually identify the common portions of the different routes 206, 208 in a manner that is quick and intuitive, the pilot can more efficiently direct his or her focus to the more significant differences between the two routes 206, 208.

Figure 3:
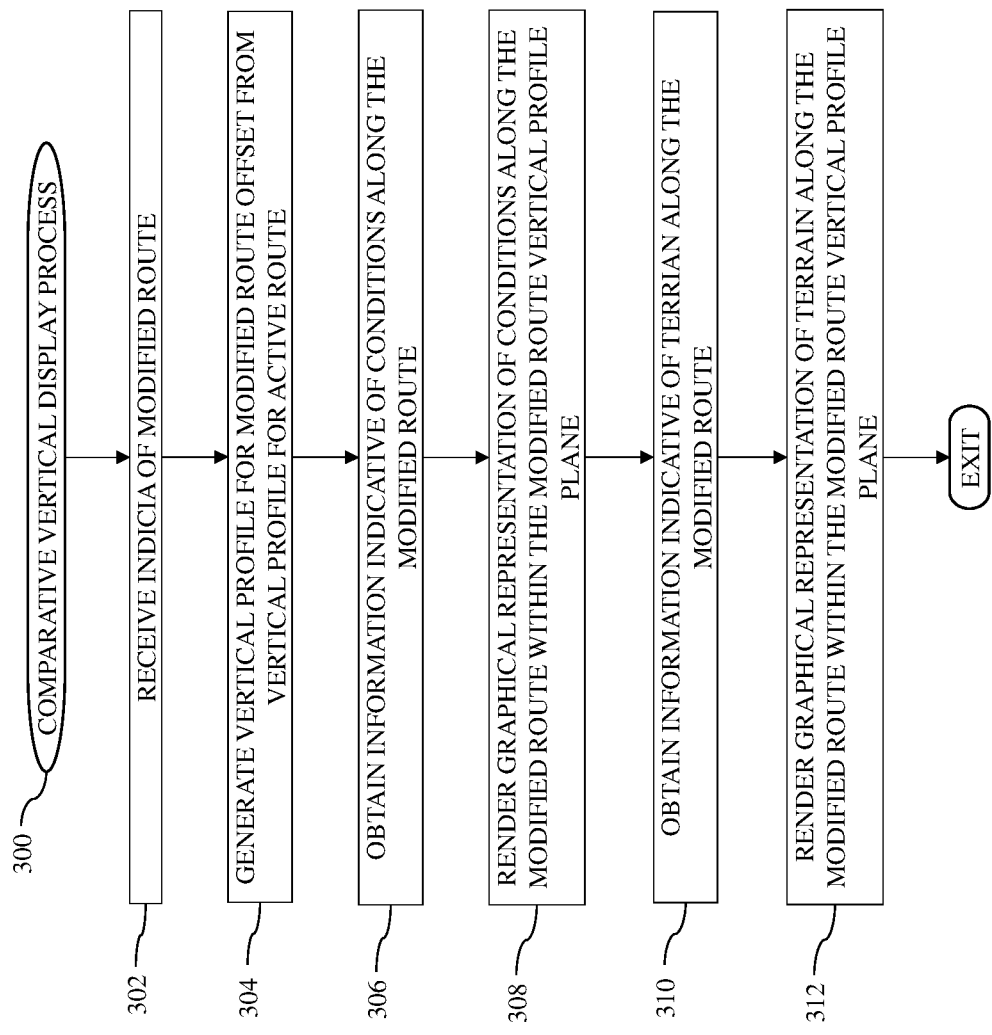
FIG. 3 is a flow diagram of an exemplary comparative vertical display process suitable for use with the aircraft in the system of FIG. 1 in connection with generating a comparative vertical profile GUI display in accordance with one or more embodiments.

Referring now to FIG. 3, in one or more exemplary embodiments, the aircraft system 100 is configured to support a comparative vertical display process 300 to display, present, or otherwise provide graphical representations of vertical profiles for multiple different potential routes concurrently on a common vertical profile GUI display and perform additional tasks, functions, and operations described below. In one or more embodiments, the comparative vertical display process 300 may be automatically initiated in response to the processing system 108 and/or the FMS 116 receiving indicia of a modified route from a pilot or other aircraft operator for diverting operation of the aircraft 102 from a previously planned route of travel. The various tasks performed in connection with the illustrated process 300 may be implemented using hardware, firmware, software executed by processing circuitry, or any combination thereof. For illustrative purposes, the following description may refer to elements mentioned above in connection with FIG. 1. In practice, portions of the comparative vertical display process 300 may be performed by different elements of the system 100, such as, the processing system 108, the display system 110, the communications system 112, the navigation system 114, the FMS 116, the onboard avionics systems 118 and/or the onboard detection systems 120. It should be appreciated that the comparative vertical display process 300 may include any number of additional or alternative tasks, the tasks need not be performed in the illustrated order and/or the tasks may be performed concurrently, and/or the comparative vertical display process 300 may be incorporated into a more comprehensive procedure or process having additional functionality not described in detail herein. Moreover, one or more of the tasks shown and described in the context of FIG. 3 could be omitted from a practical embodiment of the comparative vertical display process 300 as long as the intended overall functionality remains intact.

Still referring to FIG. 3, and with continued reference to FIG. 1, in an exemplary embodiment, the illustrated comparative vertical display process 300 begins by receiving or otherwise obtaining indicia of a potential modified route under consideration and generating a vertical profile for the modified route that is offset from the vertical profile of the currently active route on a vertical profile GUI display (tasks 302, 304). For example, in response to a pilot or other user interacting with a navigational map display 202, a waypoint list display, or another display or system to input or otherwise define one or more waypoints or other navigational reference points (e.g., waypoint WINGS) for a portion of a modified route that deviates from the initial flight plan route that is currently active and/or currently depicted at the respective display or system, the processing system 108 may receive or otherwise obtain information associated with the waypoint(s) of the modified route (e.g., the waypoint identifier, the latitude and longitudinal coordinates associated with the waypoint identifier, the input or anticipated altitude associated with traversing the waypoint coordinate location) and dynamically update the vertical profile GUI display 204 substantially in real-time to additionally include a graphical representation of the vertical profile of the modified route while concurrently depicting the vertical profile of the initial flight plan route that is currently active on the vertical profile GUI display 204. As described above in the context of FIG. 2, the modified route vertical profile is rendered in a two-dimensional plane that is parallel to the two-dimensional plane within which the flight plan vertical profiles is rendered, with the modified route vertical profile plane being obliquely offset from the flight plan vertical profile plane towards the viewer along a projection axis that is orthogonal to the two parallel vertical profile planes.

In one or more embodiments, to generate the vertical profile, the processing system 108 receives or otherwise obtains current status information pertaining to the aircraft 102 generally represents the instantaneous, real-time or most recent available values for one or more parameters that quantify the current operation of the aircraft 102 and then calculates or otherwise determines an expected vertical trajectory that represents the expected behavior or performance of the aircraft 102 vertically while traveling along the lateral trajectory defined by the modified route 208. For example, the processing system 108 may obtain (e.g., from FMS 116, navigation system 114 and/or other avionic systems 118) one or more of the following: the current location of the aircraft 102, the current altitude (or above ground level) of the aircraft 102, the current heading (or bearing) of the aircraft 102, the current amount of fuel remaining onboard the aircraft 102, the current engine status, the current aircraft configuration (e.g., the current flap configuration, the current landing gear configuration, and/or the like), and then calculate or otherwise determine the expected vertical trajectory for traveling from the current location and altitude of the aircraft 210, 224 to the initial waypoint 218 of the modified route 208 in a manner that accounts for the current aircraft state, and so on, until traversing the length of the modified route 208. The processing system 108 then renders a graphical representation of the vertical trajectory at the corresponding altitudes with respect to the vertical axis 222 at the corresponding locations along the track defined by the modified route with respect to the horizontal axis 220.

Referring again to FIG. 3, in exemplary embodiments, the comparative vertical display process 300 also receives or otherwise obtains information indicative of different external conditions along the modified route that could influence operation of the aircraft along the modified route (task 306). For example, the processing system 108 may obtain, either from the onboard detection systems 120 or an external system via communications system 112, current meteorological conditions at or near the current location of the aircraft 102 (e.g., the current temperature, wind speed, wind direction, atmospheric pressure, turbulence, and the like) as well as at various geographic locations and/or altitudes along the modified route. In this regard, in some embodiments, the expected vertical trajectory calculated for the vertical profile of the modified route may be influenced by or otherwise account for the current, forecasted and/or anticipated meteorological conditions along the modified route. Additionally, the processing system 108 may obtain from one or more onboard systems, information indicative of the current or anticipated air traffic, airspace restrictions, or other conditions along the modified route. In exemplary embodiments, the comparative vertical display process 300 renders or otherwise displays graphical representations of the conditions along the modified route on the comparative vertical profile GUI display (task 308). In this regard, the graphical representations of the meteorological conditions, air traffic, airspace restrictions and/or the like are rendered on the comparative vertical profile GUI display within the modified route vertical profile plane that is offset from the flight plan route vertical profile plane at corresponding altitudes and locations along the track defined by the modified route with respect to the axes 220, 222, as described above in the context of FIG. 2.

Still referring to FIG. 3, in exemplary embodiments, the comparative vertical display process 300 also receives or otherwise obtains information indicative of the terrain or other obstacles along the modified route and then renders or otherwise displays graphical representations of the terrain or other obstacles along the modified route on the comparative vertical profile GUI display (tasks 310, 312). For example, the processing system 108 may utilize the latitude and longitude coordinates along the modified route defined by the modified waypoint(s) to query a terrain database, an obstacle database and/or the like to obtain information indicative of the altitude or height associated with the terrain, obstacles, or other features along the modified route at those corresponding latitude and longitude coordinates. Using the retrieved altitude or height information, the processing system 108 renders a graphical representation of the terrain underlying the vertical profile of the modified route at the corresponding altitude with respect to the vertical axis 222 at the corresponding locations along the track defined by the modified route with respect to the horizontal axis 220.

As described above in the context of FIG. 2, in exemplary embodiments, the comparative vertical display process 300 utilizes different visually distinguishable characteristics to facilitate visual differentiation between depicted terrain, meteorological conditions and the like that are associated with one vertical profile plane from those rendered in the other vertical profile plane, while also utilizing different visually distinguishable characteristics to facilitate visually associating common portions of the modified route and the flight plan route while visually differentiating the portion of the modified route that deviates from a corresponding portion of the flight plan route. Thus, a pilot or other user can utilize the comparative vertical profile GUI display to simultaneously analyze the anticipated vertical situation for both the modified route and the currently active flight plan route in an expeditious manner that allows the pilot to focus on the differences between routes while deemphasizing commonalities.

By virtue of the subject matter described herein, a pilot, co-pilot, or other crew member operating the aircraft 102 may be quickly and concurrently apprised of the anticipated vertical situation of the aircraft 102 with respect to an alternative, modified, proposed or otherwise pending lateral route using a vertical profile display, thereby providing improved tactical and strategic vertical situation awareness to a pilot or other user determining whether or how to divert an aircraft from an originally-planned or current route of travel.

For the sake of brevity, conventional techniques related to vertical profile displays, flight planning, diversions, aerodynamics, aircraft modeling, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A display for an aircraft, the display having rendered thereon a vertical profile display comprising:
   a first graphical representation of a first vertical profile corresponding to a first lateral route defined by a flight plan for the aircraft; and
   a second graphical representation of a second vertical profile corresponding to a modified lateral route different from the first lateral route, wherein:
      the first graphical representation of the first vertical profile corresponding to the first lateral route and the second graphical representation of the second vertical profile corresponding to the modified lateral route are depicted on the vertical profile display concurrently;
      the first graphical representation of the first vertical profile corresponding to the first lateral route is depicted on the vertical profile display in a first plane; and
      the second graphical representation of the second vertical profile corresponding to the modified lateral route is depicted on the vertical profile display in a second plane obliquely offset from the first plane along a projection axis orthogonal to the first plane, wherein:
         the first plane is parallel to the second plane; and
         graphical representations of a position that is common to both the first lateral route and the modified lateral route are coaxially aligned along the projection axis.

2. The display of claim 1, wherein the first plane comprises an oblique projection of the second plane.

3. The display of claim 1, wherein the second plane overlies the first plane.

4. The display of claim 1, wherein a first portion of the modified lateral route is rendered using a first visually distinguishable characteristic different from the first graphical representation of the first vertical profile and a second portion of the modified lateral route that is common to the first lateral route is rendered using a second visually distinguishable characteristic in common with the first graphical representation of the first vertical profile.

5. The display of claim 1, wherein:
   the first graphical representation of the first vertical profile comprises a first depiction of terrain underlying the first lateral route;
   the second graphical representation of the modified lateral route comprises a second depiction of terrain underlying the modified lateral route; and
   the first depiction of terrain underlying the first lateral route is rendered using a different visually distinguishable characteristic than the second depiction of terrain underlying the modified lateral route.

6. The display of claim 5, wherein the different visually distinguishable characteristic comprises at least one of transparency, translucency, fading, tinting, shading or saturation.

7. The display of claim 1, further comprising:
   a third graphical representation of the aircraft depicted within the first plane at a first position with respect to the first graphical representation of the first lateral route corresponding to a first relationship between a current position of the aircraft and the first lateral route; and
   a fourth graphical representation of the aircraft depicted within the second plane at a second position with respect to the second graphical representation of the modified lateral route corresponding to a second relationship between the current position of the aircraft and the modified lateral route.

8. The display of claim 7, wherein the third graphical representation of the aircraft and the fourth graphical representation of the aircraft are coaxially aligned along the projection axis orthogonal to the first plane and the second plane.

9. A method of assisting operation of an aircraft, the method comprising:

obtaining indicia of a modified lateral route different from a flight plan route for the aircraft;

determining a vertical trajectory for the aircraft along the modified lateral route based at least in part on a current altitude of the aircraft; and providing, on a display device, a graphical representation of the vertical trajectory for the aircraft on a vertical profile graphical user interface (GUI) display within a first plane associated with the modified lateral route concurrently to providing a second graphical representation of a second vertical trajectory associated with the flight plan route on the vertical profile GUI display within a second plane obliquely offset from the first plane along a projection axis orthogonal to the first plane, wherein the first plane is parallel to the second plane and graphical representations of a position that is common to both the modified lateral route and the flight plan route are coaxially aligned along the projection axis.

10. The method of claim 9, wherein providing the graphical representation comprises rendering a first portion of the vertical trajectory of the modified lateral route using a first graphical characteristic different from a second graphical characteristic associated with the second graphical representation of the second vertical trajectory.

11. The method of claim 10, wherein providing the graphical representation comprises rendering a common portion of the vertical trajectory of the modified lateral route using a same graphical characteristic as the common portion of the second graphical representation of the second vertical trajectory.

12. The method of claim 9, further comprising:

obtaining information indicative of a meteorological condition along the modified lateral route; and providing a graphical representation of the meteorological condition on the vertical profile GUI display within the first plane associated with the modified lateral route.

13. The method of claim 12, further comprising:

obtaining second information indicative of a second meteorological condition along the flight plan route; and providing a graphical representation of the second meteorological condition on the vertical profile GUI display within the second plane associated with the flight plan route.

14. A computer-readable medium having computer-executable instructions stored thereon that, when executed by a processing system, cause the processing system to:

obtain information pertaining to a modified lateral route different from a flight plan route;

determine an anticipated vertical trajectory along the modified lateral route; and provide, on a display device, a graphical representation of the anticipated vertical trajectory on a comparative vertical profile graphical user interface (GUI) display within a first plane associated with the modified lateral route, wherein the comparative vertical profile GUI display comprises a second graphical representation of a second vertical trajectory associated with the flight plan route within a second plane obliquely offset from the first plane along a projection axis orthogonal to the first plane, wherein the first plane is parallel to the second plane and graphical representations of a position that is common to both the modified lateral route and the flight plan route are coaxially aligned along the projection axis.

15. The computer-readable medium of claim 14, wherein the computer-executable instructions cause the processing system to provide a graphical representation of an aircraft within the first plane, wherein the graphical representation of the aircraft is coaxially aligned with a second graphical representation of the aircraft within the second plane along the projection axis.

16. The display of claim 1, further comprising a navigational map display adjacent to the vertical profile display, wherein the navigational map display comprises a third graphical representation of at least a portion of the first lateral route and a fourth graphical representation of at least a portion of the modified lateral route.

17. The display of claim 1, wherein the projection axis is configured to allow vertical profile information depicted within each of the first and second planes to be viewed simultaneously on the vertical profile display.

* * * * *